(No Model.)  J. P. RIMEL.  2 Sheets—Sheet 2.
CLOVER SEED GATHERER.
No. 254,100.  Patented Feb. 21, 1882.
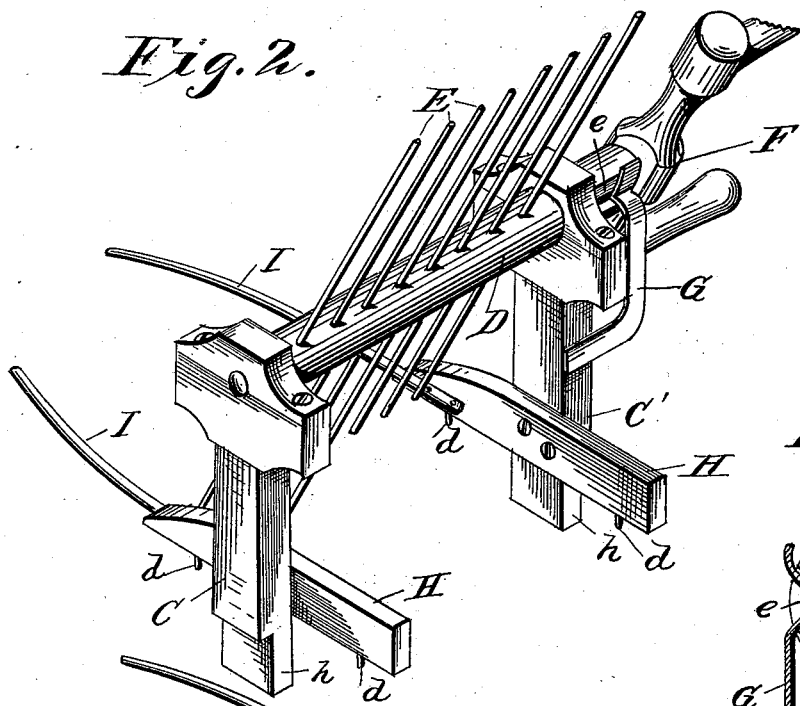
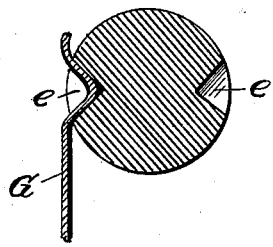
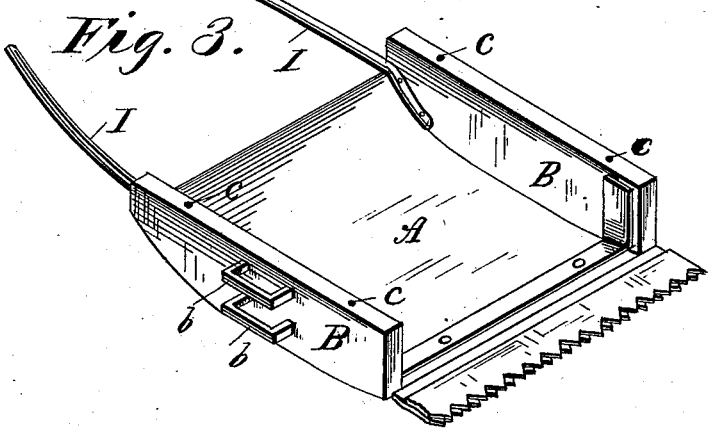

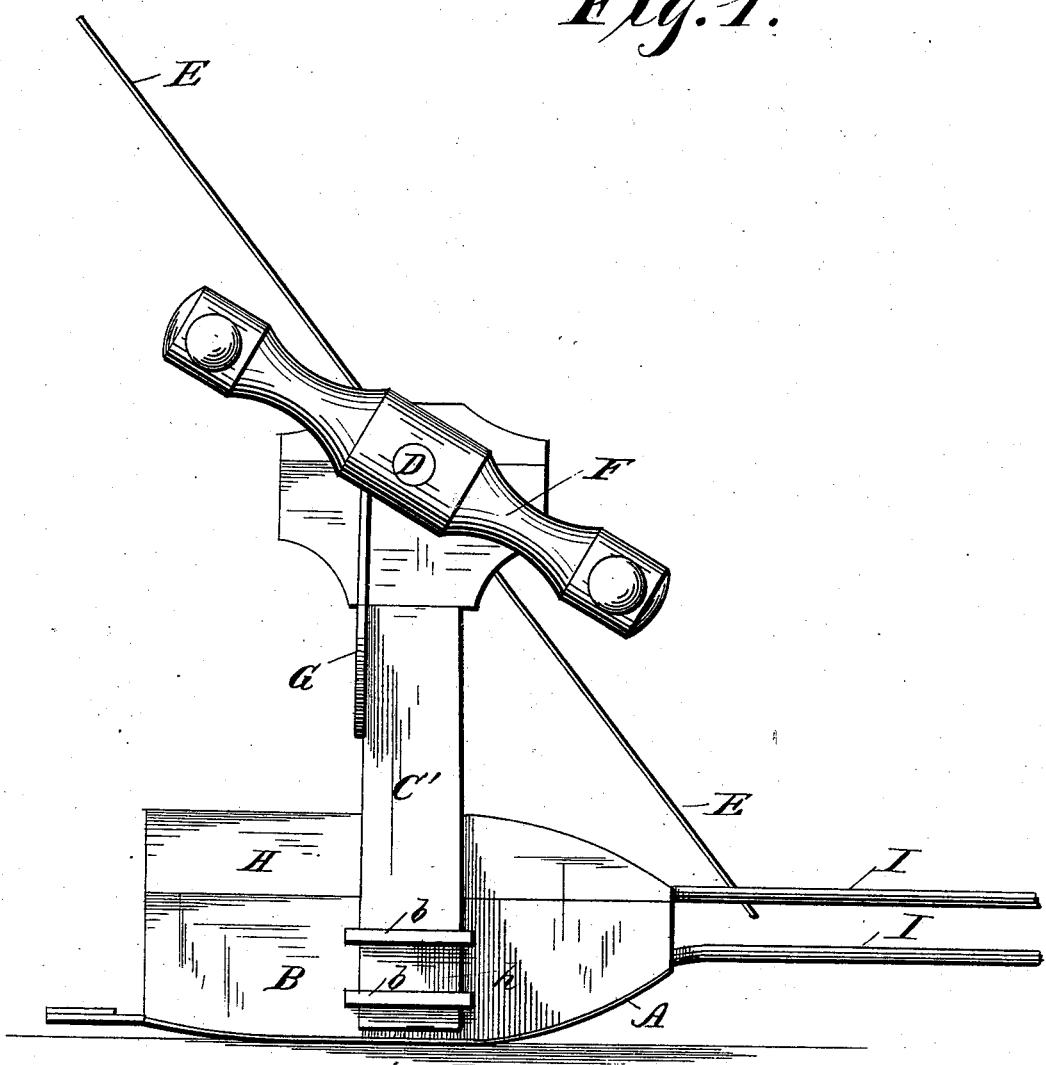

United States Patent Office.

JOHN P. RIMEL, OF STRIBLING SPRINGS, VIRGINIA, ASSIGNOR OF ONE-HALF TO EMANUEL KIRCHER, OF SAME PLACE.

CLOVER-SEED GATHERER.

SPECIFICATION forming part of Letters Patent No. 254,100, dated February 21, 1882.

Application filed November 10, 1881. (No model.)

*To all whom it may concern:*

Be it known that I, JOHN P. RIMEL, a citizen of the United States of America, residing at Stribling Springs, in the county of Augusta and State of Virginia, have invented certain new and useful Improvements in Clover-Seed Gatherers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has relation to devices for gathering clover-seed and the like; and the object of the invention is to provide a means for piling the seed-clover at suitable distances on the ground after it is cut, so as to avoid the loss of the seed, which occurs when the grass is cut in the ordinary manner by the mowing-machine and then raked into windrows or piles, said raking causing the ripe seed to become separated and lost on the ground; and to accomplish this saving of seed I attach to the cutter-bar of any of the ordinary makes of mowing-machines a platform of suitable size and shape, arranged to ride over the ground, and provided with suitable mechanism for discharging the severed clover in piles, all of which will be hereinafter more fully set forth.

In the accompanying drawings, similar letters of reference indicate like parts of the invention.

Figure 1 is a side elevation of my improved device. Figs. 2 and 3 are perspective views, showing the manner of separating the machine when the cutter-bar is raised in traveling from and to the field; and Fig. 4 is a detail of the spring and stop-motion for controlling the revolving rake.

A is a platform concave on its upper side, and provided with sides B B. This platform is hinged to the cutter-bar of a mowing-machine and drags along after it, the hinge allowing it to conform to any inequalities in the ground. The sides B B are provided with staples b b, into which fit the ends of the standards C C', and in the upper ends of the standards C C' is journaled a shaft, D, having rake-teeth E and a crank, F. That part of the shaft between the standard C' and the crank F has two indentations or stops, e e, into which the upper end of a spring, G, secured to the standard C', presses. The stops e e are arranged with reference to the teeth E, so that said teeth are ordinarily held in position near the rear end of the platform A. Near the lower part of the standards C C' are secured transverse cleats H H, which serve to hold the said standards securely in position on the platform by means of the tenons h h and the pins d d, which fit into the holes c c on the sides B B.

To the rear of the sides B B and the cleats H H are secured two converging guide-fingers, I I, which prevent the clover as it is swept from the platform from falling on the line of the uncut clover, and also to assist the formation of the piles, and, further, to so pile the grass that it will leave a clear track for the passage of the machine on the next cut.

The operation is as follows: The platform being attached to the cutter-bar and the crank F within easy reach of the driver, the rake is in the position shown in Fig. 1. The clover or grass as it is cut falls on the platform, and is retained there by the rake-teeth. When a sufficient quantity has been cut the driver gives the crank a half-turn, which releases the spring from its stop or notch and causes it to fall into the opposite one, at the same time the clover collected on the platform is swept off by the rake-teeth, and, with the assistance of the fingers, is formed into a pile.

Having thus fully described my invention, what I claim as new and useful, and desire to secure by Letters Patent, is—

1. The combination, with a mowing-machine, its cutter-bar, and finger-bar, of the platform secured to the finger-bar, the standards C C', shaft D, provided with notches e e, rake-teeth E, spring G, crank F, and the fingers I I, substantially as, and for the purpose set forth.

2. The combination, with a mowing-machine, its cutter-bar, and finger-bar, of the platform A, secured to said finger-bar, and having sides B B, provided with staples b b and holes c c, the standards C C', having tenon h h, and cleats H H, having pins d d, shaft D, provided with notches e e, rake-teeth E, spring G, crank F, and fingers I I, all constructed and relatively to operate substantially as and for the purpose herein shown and described.

In testimony whereof I affix my signature in presence of two witnesses.

JOHN P. RIMEL.

Witnesses:
I. BELL KINNEY,
JOHN SNYDER.